United States Patent
Konradi et al.

(10) Patent No.: US 11,150,219 B2
(45) Date of Patent: Oct. 19, 2021

(54) BIO-RECOGNITION ELEMENTS

(71) Applicant: BASF SE, Ludwigshafen am Rhein (DE)

(72) Inventors: Rupert Konradi, Ludwigshafen (DE); Matthias Kellermeier, Ludwigshafen (DE); Peter Stengel, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 363 days.

(21) Appl. No.: 16/322,773

(22) PCT Filed: Jul. 26, 2017

(86) PCT No.: PCT/EP2017/068837
§ 371 (c)(1),
(2) Date: Feb. 1, 2019

(87) PCT Pub. No.: WO2018/024560
PCT Pub. Date: Feb. 8, 2018

(65) Prior Publication Data
US 2020/0348263 A1    Nov. 5, 2020

(30) Foreign Application Priority Data
Aug. 3, 2016 (EP) .................. 16182572.4

(51) Int. Cl.
| | | |
|---|---|---|
| *G01N 29/00* | (2006.01) | |
| *G01N 29/02* | (2006.01) | |
| *C08F 220/28* | (2006.01) | |
| *C08F 212/08* | (2006.01) | |
| *G01N 29/036* | (2006.01) | |
| *C09D 125/14* | (2006.01) | |
| *C09D 133/14* | (2006.01) | |

(52) U.S. Cl.
CPC ......... *G01N 29/022* (2013.01); *C08F 212/08* (2013.01); *C08F 220/286* (2020.02); *G01N 29/036* (2013.01); *C09D 125/14* (2013.01); *C09D 133/14* (2013.01); *G01N 2291/0255* (2013.01); *G01N 2291/0256* (2013.01); *G01N 2291/0426* (2013.01)

(58) Field of Classification Search
CPC .. C08F 212/08; C08F 220/286; C08F 220/28; C09D 125/14; C09D 133/14; G01N 2291/0255; G01N 2291/0256; G01N 2291/0426; G01N 29/022; G01N 29/036
See application file for complete search history.

(56) References Cited

U.S. PATENT DOCUMENTS

| | | | |
|---|---|---|---|
| 6,406,530 B1 * | 6/2002 | Bengs | ............. C08J 5/18 106/137.1 |
| RE45,500 E | 4/2015 | Luthra et al. | |
| 2002/0068157 A1 | 6/2002 | Wischerhoff | |
| 2003/0165613 A1 | 9/2003 | Chappa et al. | |
| 2004/0170752 A1 | 9/2004 | Luthra et al. | |
| 2005/0158850 A1 * | 7/2005 | Kubo | ........... G01N 21/553 435/287.2 |
| 2007/0292596 A1 | 12/2007 | Chappa et al. | |
| 2009/0130778 A1 * | 5/2009 | Kalgutkar | ........... C23C 14/20 436/526 |
| 2009/0236229 A1 * | 9/2009 | Advincula | ........... C09D 5/4419 205/91 |
| 2010/0240789 A1 | 9/2010 | Chappa et al. | |
| 2012/0004339 A1 | 1/2012 | Chappa et al. | |
| 2014/0125196 A1 * | 5/2014 | Ma | ............. C08K 3/38 310/311 |
| 2016/0351443 A1 * | 12/2016 | George | ............. B32B 15/20 |
| 2019/0225817 A1 * | 7/2019 | Ozcelik | ............. A61L 27/18 |

FOREIGN PATENT DOCUMENTS

| | | |
|---|---|---|
| DE | 10 2004 003 793 A1 | 8/2005 |
| WO | WO 02/35230 A1 | 5/2002 |
| WO | WO 03/055611 A1 | 7/2003 |
| WO | WO 2016/123675 A1 | 8/2016 |

OTHER PUBLICATIONS

Extended European Search Report dated Jan. 23, 2017 in Patent Application No. 16182572.4.
Hucknall, A. et al. "In Pursuit of Zero: Polymer Brushes that Resist the Adsorption of Proteins" Advanced Materials, vol. 21, Issue 23, 2009, pp. 2441-2446.
Konradi, R. et al. "Polyoxazolines for Nonfouling Surface Coatings—A Direct Comparison to the Gold Standard PEG" Macromolecular Rapid Communications, vol. 33, Issue 19, 2012, pp. 1663-1676.
International Search Report dated Sep. 8, 2017 in PCT/EP2017/068837 filed Jul. 26, 2017.
U.S. Appl. No. 15/565,938, filed Oct. 12, 2017, US 2018-0056245 A1, Rupert Konradi.

* cited by examiner

*Primary Examiner* — Francis C Gray
(74) *Attorney, Agent, or Firm* — Armstrong Teasdale LLP

(57) ABSTRACT

Biosensor BS comprising at least one polymer P wherein said polymer P is a copolymer of at least monomer M and at least one ester E of (meth)acrylic acid and polyethylene oxide, wherein said monomer M is different from ester E and has at least one ethylenically unsaturated double bond, wherein polymer P has a surface adsorption SA of at least 200 ng/cm$^2$ on the respective surface where polymer P is deposited, said SA being determined by quartz crystal microbalance.

14 Claims, No Drawings

BIO-RECOGNITION ELEMENTS

The present invention is directed to Biosensor BS comprising at least one polymer P wherein said polymer P is a copolymer of at least monomer M and at least one ester E of (meth)acrylic acid and polyethylene oxide, wherein said monomer M is different from ester E and has at least one ethylenically unsaturated double bond, wherein polymer P has a surface adsorption SA of at least 200 ng/cm$^2$ on the respective surface where polymer P is deposited, said SA being determined by quartz crystal microbalance.

It is more especially directed to biosensors BS comprising at least one polymer P wherein said polymer P is a copolymer of styrene and at least one ester E of (meth)acrylic acid and polyethylene oxide.

The present invention is further directed to bio-recognition elements B having a surface O and comprising on said surface O at least one bioreceptor BR wherein said surface O is at least partly coated with at least one polymer P wherein said polymer P is a copolymer of styrene and at least one ester E of (meth)acrylic acid and polyethylene oxide.

Different types of bio-recognition elements play an increasingly important role in many fields of technology. For example, analytical methods for sugar/carbohydrate sensing, e.g. glucose sensing, immunosensing and DNA and RNA sensing rely more and more on biosensors that make use of bio-recognition elements.

An important issue with the application of biosensors and bio-recognition elements is fouling. Fouling, herein also referred to as biofouling, in this context means the unwanted deposition of organic material on a surface.

For biosensors, one undesired side effect of fouling is that the signal-to-noise ratio of the detected signals and the limit of detection (LOD) is worsened due to adsorption into areas where no bioreceptor is deposited.

Several approaches have been tried to solve the problem of fouling and to prevent the formation and deposition of organic materials on a surface.

A. Hucknall et al. Adv. Mater. 2009, 21, 2441 disclose the antibiofouling efficiency and application to biosensing applications of poly(oligo(ethylene glycol) methacrylate) brushes that were grafted from various substrates, e.g. gold. Konradi et al., Macromol. Rapid Commun. 2012, 33, 1663-1676 discloses the antibiofouling efficiency of comb polymers on surfaces.

There is a need for improved solutions for reducing fouling on biosensors and bio-recognition elements.

The objective of the present invention was therefore to provide processes for reducing the fouling on bio-recognition elements that are effective for reducing fouling and easy to carry out.

This objective was achieved by biosensors BS comprising at least one polymer P, wherein said polymer P is a copolymer of at least monomer M and at least one ester E of (meth)acrylic acid and polyethylene oxide, wherein said monomer M is different from ester E and has at least one ethylenically unsaturated double bond, wherein polymer P has a surface adsorption SA of at least 200 ng/cm$^2$ on surface O, and by bio-recognition elements B having a surface O and comprising on said surface O at least one bioreceptor BR wherein said surface O is at least partly coated with at least one polymer P wherein said polymer P is a copolymer of monomer M and at least one ester E of (meth)acrylic acid and polyethylene oxide, said SA being determined by quartz crystal microbalance as described in example 15.

In one preferred embodiment, said polymer P is a copolymer of styrene and at least one ester E of (meth)acrylic acid and polyethylene oxide.

The concept of biosensors and of bio-recognition elements is in principle known in the art.

In the context of this application, a bio-recognition element shall be understood to be a device that has a surface O, wherein on that surface O at least one bioreceptor BR has been deposited.

The term "deposit" in the context with the deposition of bioreceptors BR on surface O shall mean that such bioreceptors BR have been spatially fixated on surface O regardless by which method such bioreceptors BR have been deposited and regardless by which mechanism they are bound to surface O. For example, bioreceptors can be bound to surface O though chemical bonds, chemisorption (formation of chemical bonds) or physisorption (e.g. adsorption, van der Waals forces, electrostatic interaction). Bioreceptors BR can for example be deposited on surface O by printing techniques or by patterning techniques such as photolithography.

Bio-recognition elements B are in many cases part of a biosensor BS. Biosensors are analytical devices that are designed to detect an analyte. Biosensors BS normally comprise at least one bio-recognition element B, a biotransducer component BT and in many cases an electronic processing system. In many cases biosensors BS also comprise tubes or pipes that are designed to transport fluids comprising the analyte towards and away from the biorecognition element B as well a housing to protect the biosensor.

An analyte shall mean a substance, species of chemical that shall be detected in an analytical process Bioreceptors BR are designed to interact with the specific analyte of interest to produce an effect measurable by the biotransducer.

Normally bioreceptors BR are biomolecules from organisms or receptors modeled after biological systems to interact with the analyte of interest.

Typical bioreceptors BR include proteins, antibody/antigen, enzymes, nucleic acids/DNA, sugars, carbohydrates, cells or cellular structures, or biomimetic materials.

In a preferred embodiment, bioreceptors BR are proteins such as antigens and antibodies, peptides, DNA, RNA, sugars and carbohydrates.

In one embodiment, bio-recognition elements B comprise only one kind of bioreceptor BR.

In one embodiment, bio-recognition elements B comprise an array of bioreceptors BR.

Surface O of bio-recognition element B can in principle be made of any material, on which bioreceptors BR can be deposited.

Preferably, surfaces O are made of glass, quartz, silicon, metals, metal oxides or organic polymers.

Suitable organic polymers for surfaces O include polycarbonate, polystyrene, hydrophilized polystyrene, polyamide, poly(methyl methacrylate), polyolefines such as polyethylene, polypropylene, polynorbornene, cyclic olefin polymers (COP) or cyclic olefin copolymers (COC) such as copolymers of ethylene and norbornene.

Especially preferably, surfaces O of bio-recognition elements B are made of low fluorescence, high optical transmittance cyclic olefin (co)polymers (COP/COC) such as copolymers of ethylene and norbornene. Such polymers are commercially available, e.g., under the tradename TOPAS®.

In one embodiment of the present invention, biosensors BS comprise biorecognition elements B, tubes, pipes or housing elements that are at least partly coated with at least one polymer P.

In one embodiment of the present invention, bio-recognition elements B have a surface O and comprise on said surface O at least one bioreceptor BR wherein said surface O is at least partly coated with at least one polymer P.

Polymer P is a copolymer of at least monomer M and at least one ester E of (meth)acrylic acid and polyethylene oxide, wherein said monomer M is different from ester E and has at least one ethylenically unsaturated double bond, wherein polymer P has a surface adsorption number SA of at least 100, preferably 200 ng/cm$^2$ on the respective surface where it has been deposited, said SA being determined by quartz crystal microbalance as described in the experimental section.

The SA is a parameter that describes the ability of polymers to be adhesively bound to a surface. A high SA indicates that a polymer is strongly bound to a surface. A low SA indicates that a polymer is weakly bound to a surface.

The SA of a polymer is determined by quartz crystal microbalance (QCM) according to the procedure given in the experimental section.

Preferably, monomer M is styrene. In this embodiment polymer P thus comprises styrene and at least one ester E of (meth)acrylic acid and polyethylene oxide. In the context of this application, this shall mean that polymer P comprises these monomers in polymerized form.

Polymer P normally comprises styrene and ester E in a molar ratio from 0.05 to 50 (meaning that the molar ratio of styrene to ester E is 0.05:1 to 50:1). For such copolymers of styrene and ester E, the SA is always considered to be at least 200 ng/cm$^2$ and the measurement of the SA is not necessary. Preferably, the molar ratio of styrene to ester E in polymer P is 0.2:1 to 15:1, more preferably 0.3:1 to 10:1 and especially preferably 0.5:1 to 2:1.

In one embodiment, ester E is an ester of acrylic acid and polyethylene oxide.

In one embodiment, ester E is an ester of methacrylic acid and polyethylene oxide.

In a less preferred embodiment said polyethylene oxide is esterified on one end with (meth)acrylic acid and bears a hydroxy group on the other end.

In a preferred embodiment said polyethylene oxide is esterified on one end with (meth)acrylic acid and has been functionalized on the other end, for example by pro forma etherification with an alkyl group like methyl, ethyl, propyl or butyl, preferably methyl. The latter are normally obtained by alkoxylation of alcohols like methanol.

Thus, in one embodiment, ester E is an ester of acrylic acid and polyethylene glycol mono alkyl ether.

In one embodiment, ester E is an ester of methacrylic acid and polyethylene glycol mono alkyl ether.

Polyethylene oxide in this context shall mean a polyalkylene oxide that consists essentially of oxyethylene units and optionally a terminal alkyl ether group. In particular, polyethylene oxide comprises less than 10 mol % of oxyalkylene units different from oxyethylene. Preferably, polyethylene oxide as used in this context comprises less than 5 mol %, more preferably less than 1 mol % of oxyalkylene units different from oxyethylene. In an especially preferred embodiment polyethylene oxide as used herein consists of oxyethylene units and a terminal alkyl ether group. Polyethylene oxide is in many cases prepared by ring opening polymerization of ethylene oxide using alcohols like methanol, ethanol, n/iso-propanol or n/sec/tert-butanol as a starter.

Preferably, ester E has an average molar mass Mn of 300 to 10.000 g/mol, more preferably 500 to 10,000 and even more preferably 800 to 10,000 g/mol, especially preferably 1,000 to 10,000 g/mol and particularly preferably 1500 to 10,000 g/mol.

In another embodiment, ester E has an average molar mass Mn of 300 to 8,000 g/mol, more preferably 300 to 5,000 and even more preferably 300 to 3,000 g/mol and especially preferably 300 to 2000 g/mol.

In especially preferred embodiments, ester E has an average molar mass Mn of 500 to 8000 g/mol, 1000 to 5000 g/mol, 800 to 3000 g/mol, 1000 to 3000 g/mol, 800 to 2500 g/mol or 1500 to 2000 g/mol.

In one embodiment, polymer P is a copolymer of styrene and ester E and comprises up to 10% by weight of monomers different from styrene and ester E, preferably up to 5% and more preferably up to 1% by weight. In one embodiment, polymer P consists essentially of or consists of styrene and ester E.

Polymer P preferably has an average molar mass Mn of 5,000 to 100,000 g/mol. (All values for the average molar mass Mn given in this application are determined by gel permeation chromatography (GPC) using the method as described in the experimental section of this application).

Polymer P is normally prepared by radical polymerization of styrene and ester E.

In one preferred embodiment, polymer P is prepared by solution polymerization. "Solution polymerization" means that all starting materials are at least partly dissolved in the same solvent and that the polymerization reaction takes place in homogenous phase, without additional surfactants having to be present. In one preferred embodiment, styrene and ester E are dissolved in suitable solvents like alcohols like methanol, ethanol, 1-propanol, 2-propanol, butanol or mixtures thereof and are then polymerized. Preferably, such solvents for the solution polymerization of styrene and ester E comprise at least 50% by weight, preferably 70% and more preferably 80% by weight of alcohols like methanol, ethanol, 1-propanol, 2-propanol, butanol or mixtures thereof. Preferably, such solvents for the solution polymerization of styrene and ester E comprise 20% by weight or less, preferably 10% by weight or less of water. Unpolar solvents like hydrocarbons (for example aromatic solvents like toluene) are in principle also possible solvents for such solution polymerizations. However, they yield polymers with different properties. In particular, the antifouling properties of such polymers are not as beneficial as from alcohols. Thus, it is preferred to have such hydrocarbons like toluene present in the polymerization solvent in amounts of 20% by weight and below, preferably of 10% by weight and below based on the solvent mixture.

Said radical polymerization can in one embodiment be initiated by oxidative radical starters like organic peroxides (e.g. sodium persulfate, potassium persulfate, metachloroperbenzoic acid). In another embodiment radical polymerization is initiated by azo starters like azo-bisisobutyrodinitrile or 2,2'-Azobis(2-methylbutyronitrile) (V-59, Wako pure chemical industries, Ltd).

Polymers P obtained by solution polymerization yield aqueous solutions that are very effective with respect to the reduction of fouling. In many cases, Polymers P obtained by solution polymerization yield aqueous solutions that are clear and do not show any turbidity at room temperature.

In a less preferred embodiment, polymer P is prepared by emulsion polymerization.

As it turned out quite unexpectedly, polymers that are obtained by emulsion polymerization are less effective in preventing fouling than polymers obtained by solution polymerization.

Polymer P is preferably a statistical copolymer in which styrene and ester E are distributed statistically.

According to the invention, surface O is at least partly coated with at least one polymer P. The term "coated" shall mean that polymer P has been deposited on surface O, covering it at least partly. Polymer P is normally bound to surface O via physisorption like adhesion.

Typically, polymer P is comprised on the surface of tubes, pipes and/or other housing elements of biosensor BS and/or on surface O of bio-recognition elements B in amounts of 100 to 1000 $ng/cm^2$.

In one embodiment, the surface of tubes, pipes and/or other housing elements of biosensor BS and/or bio-recognition elements B comprise a self-assembled monolayer of at least one polymer P. A "self-assembled monolayer" means a molecular assembly formed spontaneously on a surface by adsorption and organized into more or less large ordered domains. Self-assembled monolayers normally have a thickness that correlates with the size of the individual molecules adsorbed to that surface and that is normally smaller than 100 nm. Such self-assembled monolayers form spontaneously on such surfaces without any further process step being required.

Self-assembled monolayers can for example be characterized by atomic force microscopy (AFM) or X-ray photoelectron spectroscopy (XPS) or in situ methods such as quartz crystal microbalance or surface plasmon resonance spectroscopy.

Another aspect of the present invention are processes for making biosensors BS, wherein a solution S of at least one polymer P is deposited on the surface of at least one tube, pipe or housing element of biosensor BS. Optionally, the solvent of solution S is removed after depositing solution S on said surface.

Another aspect of the present invention are processes for making bio-recognition elements B, wherein a solution S of at least one polymer P is deposited on surface O.

Process for making bio-recognition element B comprise the following steps:
  A) Providing a surface O,
  B) Applying a solution S of at least one polymer P, wherein said polymer P is a copolymer of at least monomer M and at least one ester E of (meth)acrylic acid and polyethylene oxide, wherein said monomer M is different from ester E and has at least one ethylenically unsaturated double bond, wherein polymer P has a surface adsorption SA of at least 200 $ng/cm^2$ on surface O,
  C) Depositing at least one bioreceptor BR on the surface; wherein step C) can be carried out before, during or after step B).

In one embodiment, processes for making bio-recognition elements B comprise the following steps:
  A) Providing a surface O,
  B) Applying a solution S of at least one polymer P comprising styrene and at least one ester E of (meth)acrylic acid and polyethylene oxide in a molar ratio of 0.05:1 to 50:1,
  C) Depositing at least one bioreceptor BR on surface O; wherein step C) can be carried out before, during or after step B).

When it is stated herein that bioreceptors BR are deposited on surface O, this may, depending on the context, in one embodiment mean that bioreceptors BR are deposited on surface O without aqueous solution S having been applied before or in another embodiment that bioreceptors BR are deposited on surface O after aqueous solution S has been applied.

Said aqueous solution S normally comprises 0.001 to 10% by weight of polymer P based on the solution S, preferably 0.01 to 1% by weight and even more preferably 0.05 to 0.3% by weight.

In a preferred embodiment, solution S is an aqueous solution.

"Aqueous" in this context shall mean that said polymer P is dissolved in a solvent or solvent mixture that comprises at least 50% by weight, preferably at least 70% by weight, more preferably at least 90% by weight and particularly preferably at least 99% by weight of water. In a preferred embodiment, the solvent in which said at least one polymer P is dissolved is water. An "aqueous solution" of at least one polymer P shall mean that said at least one polymer P is completely or partly dissolved in an aqueous solvent. In a preferred embodiment, said aqueous solution S is a clear solution without any turbidity. In another embodiment, said aqueous solution S comprises polymer P at least partly in dissolved state but shows turbidity.

Preferably, solution S is an aqueous solution comprising at least 50% of water.

In another embodiment, solution S comprises at least 50% by weight, preferably at least 70% by weight, more preferably at least 90% by weight and particularly preferably at least 99% by weight of at least one alcohol like methanol, ethanol, n/iso-propanol or n/sec/iso/tert-butanol.

Through the deposition of polymer P on surface O, the fouling and/or biofouling of bio-recognition element B is reduced.

In one embodiment, processes for making bio-recognition elements B comprise the following steps:
  A) Providing a surface O,
    B1) Applying a solution S of at least one polymer P wherein said polymer P is a copolymer of at least monomer M and at least one ester E of (meth)acrylic acid and polyethylene oxide, wherein said monomer M is different from ester E and has at least one ethylenically unsaturated double bond, wherein polymer P has a surface adsorption SA of at least 200 $ng/cm^2$ on surface O,
    B2) removing the solvent of said aqueous solution S from the surface,
  C) Depositing at least one bioreceptor BR on the surface; wherein steps A) to C) are carried out in the order given.

In one embodiment, processes for making bio-recognition elements B comprise the following steps:
  A) Providing a surface O,
    B1) Applying an aqueous solution S of at least one polymer P comprising styrene and at least one ester E of (meth)acrylic acid and polyethylene oxide,
    B2) removing the solvent of said aqueous solution S,
  C) Depositing at least one bioreceptor BR on surface O, wherein steps A) to C) are carried out in the order given.

In one embodiment, processes for making bio-recognition elements B comprise the following steps:
  A) Providing a surface O
    C1) Depositing at least one bioreceptor BR on the surface,
    C2) Optionally removing the solvent of the bioreceptor depositing step C1),
    B1) Applying a solution S of at least one polymer P wherein said polymer P is a copolymer of at least monomer M and at least one ester E of (meth)acrylic acid and polyethylene oxide, wherein said monomer M is different from ester E and has at least one ethylenically unsaturated double bond, wherein polymer P has a surface adsorption SA of at least 200 ng/cm$^2$ on surface O, B2) Optionally removing the solvent of said aqueous solution S from the surface, wherein steps A) to C) are carried out in the order given.

In one embodiment, processes for making bio-recognition elements B comprise the following steps:

A) Providing a surface O,

C) Depositing at least one bioreceptor BR on surface O,

B1) Applying an aqueous solution S of at least one polymer P comprising styrene and at least one ester E of (meth)acrylic acid and polyethylene oxide, B2) Optionally removing the solvent of said aqueous solution S wherein steps A) to C) are carried out in the order given.

In one embodiment, processes for making bio-recognition elements B comprise the following steps:

A) Providing a surface O

C1) Depositing at least one bioreceptor BR on the surface,

C2) Optionally removing the solvent of the bioreceptor depositing step C1),

B1) Applying a solution S of at least one polymer P comprising styrene and at least one ester E of (meth) acrylic acid and polyethylene oxide, B2) Optionally removing the solvent of said aqueous solution S from the surface, wherein steps A) to C) are carried out in the order given.

Another aspect of the invention are bio-recognition elements B prepared by processes according to the invention for making bio-recognition elements B.

Another aspect of the invention are biosensors BS comprising at least one bio-recognition element B.

Biosensors BS comprise at least one bio-recognition element B, and normally comprise a biotransducer component BT and in many cases an electronic processing system.

The unexpected positive effects of biosensors BS are normally independent from the nature of biotransducer component BT.

Biotransducer component BT can for example rely on electrochemical effects, ion channel switches, optical effects, gravimetric effects, piezoelectric effects or pyroelectric effects. In a preferred embodiment, biotransducer components BT use optical effects that rely on fluorescence signals. Such fluorescence signals can for example be detected by charge coupled devices (CCD) or Complementary metal-oxide-semiconductors (CMOS).

Biosensors BS or bio-recognition elements B can for example be used in medical diagnostics, drug discovery applications, biological fuel cells, biocomputing, DNA chips and nucleic acid sensors, electronic noses, enzyme biosensors, immunosensors, proteomics sensors, glucose sensors, oligo/polysaccharide sensors, lab-on-a-chip, microfluidics, mobile diagnostics and telecomputing, nanomaterials and nanoanalytical systems, natural and synthetic receptors, organism- and whole-cell based biosensors, printed biosensors and organic electronics, single cell detection/analysis, infectious disease detection, personal health monitoring.

In preferred embodiments, bio-recognition elements B or biosensors BS are used in the analysis of body fluids like blood or urine, waste water, drinking water, fermentation broths, food quality, e.g., in beverages such as beer, fruit juices and soft drinks, and food quality of fresh meat, poultry, fish or dairy products.

Biosensors BS and bio-recognition elements B show improved fouling behavior. Thus, the efficiency of bio-recognition elements B or of biosensors BS comprising bio-recognition elements B is increased. Bio-recognition elements B treated according to the invention are also easier to clean.

Bio-recognition elements B and biosensors BS comprising bio-recognition elements B show an improved signal to noise ratio and/or an improved limit of detection (LOD) in analytical processes for detecting analytes. Thus, Bio-recognition elements B and biosensors BS comprising bio-recognition elements B have excellent sensitivities for detecting analytes.

Also, Bio-recognition elements B and biosensors BS comprising bio-recognition elements B may contain very densely packed arrays of bioreceptors.

EXAMPLES

Abbreviations Used

SA Surface Adsorption
w. % % by weight
PEGMA polyethylene glycol methacrylic ester
PEGMA2000 polyethylene glycol methacrylic ester with an average molecular mass Mn of 2000 g/mol
PEGMA1000 polyethylene glycol methacrylic ester with an average molecular mass Mn of 1000 g/mol
PEGMA550 polyethylene glycol methacrylic ester with an average molecular mass Mn of 550 g/mol
Sty styrene
PEGA polyethylene glycol acrylic ester
ATRP atom transfer radical polymerization
Mn average molecular weight
SEC size exclusion chromatography
QCM quartz crystal microbalance
PES polyethersulfone
PVDF polyvinylidenedifluoride
PA polyamide
PS polystyrene
HEPES 4-(2-hydroxyethyl)-1-piperazineethanesulfonic acid
UF ultrafiltration
PWP pure water permeability
RF$_{coating}$ flux recovery after coating
FR$_{fouling}$ flux recovery after fouling
h hour(s)
s second(s)
MWCO Molecular Weight Cut-Off
COP Cyclic olefin polymer
COC Cyclic olefin copolymer
TOPAS® COC of ethylene and norbornene
BSA Bovine serum albumin Number average molecular weights Mn were determined by gel permeation chromatography (Size Exclusion Chromatography) as follows:

Size Exclusion Chromatography was completed using a mixed bed scouting column for water soluble linear polymers, TSKgel GMPWxl from Tosoh Bioscience LLC, at 35° C. The eluent used was 0.01 M phosphate buffer at pH=7.4 containing 0.01 M sodium azide.

The polymer used as 1.5 mg/mL concentrated solution in the eluent. Before injection in a 100 μL injection loop, all samples were filtered through a Millipore IC Millex-LG (0.2 μm) filter.

The calibration was carried out with narrow polyacrylic acid sodium salt samples from PSS Polymer Standards Service having molecular weights between 900 to 100000 g/mol, as well as using polyacrylic acid samples from American Polymer Standards Corporation with molecular weights of 1770 g/mol and 900 g/mol. Values outside this interval were extrapolated. For Mn calculations 3800 g/mol was fixed as the lower limit.

The SA was determined by The Quartz-Crystal Microbalance with dissipation monitoring (QCM-D, a special embodiment of the QCM method). The Quartz-Crystal Microbalance with dissipation monitoring (QCM-D) measures the resonance frequency of a freely oscillating quartz crystal after excitation. The shift in resonance frequency scales inversely proportionally with mass changes at the quartz surface. The SA was calculated from the shift of the $7^{th}$ overtone of the resonance frequency according to the method of Sauerbrey (G. Sauerbrey, Zeitschrift für Physik 1959, volume 155, pages 206-222). The Q-Sense E4 (Biolin Scientific Holding AB) operating system has a mass sensitivity of about 2 ng/cm². QCM measurements were performed using standard flow-through methods with a flow rate of 50 µL/min at 23° C. An experiment comprised the following steps: 1) 10 mmol/L HEPES buffer pH 7 (="buffer") until a stable baseline was achieved; 2) 2 h 0.1 wt % polymer solution in buffer; 3) 2 h buffer; 4) optionally 0.5 h 0.1 wt % BSA or milk in buffer pH 7 for determining the BSA or milk adsorption; 5) 0.5 h buffer. For cases in which the SA of polymer P on a surface different from quartz was to be determined, model polymer surfaces were generated on the QCM sensor surface by coating with a layer with a thickness of 10 to 500 nm (determined through the weight difference of the QCM sensor) of the respective model polymer. The thickness of the model polymer layer does not affect the results of the QCM measurement as long as it is within the specified range. Means for generating a model polymer layer on a quartz surface is known to skilled persons. Methods for generating model polymer layers on the QCM sensor include dip-coating (for example for PES and PVDF) and spin-coating (for example for PS and TOPAS®). For dip-coating, the sensor was briefly immersed into a 1% solution of the respective polymer in N-methyl-pyrrolidone and subsequently dried at 200° C. using a heat gun. Dip coating was applied to facilitate the removal of the high boiling solvent NMP. For spin-coating, a 40 µL drop of 1% polymer solution in tetrahydrofuran (PS) or xylene (TOPAS) was placed in the center of the quartz crystal and spread across the surface by spinning at 4000 rpm for 30 s. The method for generating the model polymer surface does not have an effect of the SA of polymer P and can be chosen by the skilled person based on the boiling point of the solvent in which the model surface polymer is dissolved.

When no other solvent is given in the experimental procedure, such experiments were carried out in water.

Example 1: Preparation of Copolymer X1
(Sty:PEGMA2000=1:4, Numbers in Header Give the Approximate Molar Ratio of the Components Used)

400.4 parts by weight of 1-propanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, 1.3 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 10900 g/mol. A clear solution was obtained. After drying a white powder was recovered.

Example 2: Preparation of Copolymer X2
(Sty:PEGMA2000=1:1)

400.4 parts by weight of 1-propanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, 5.2 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 11200 g/mol. A clear solution was obtained. After drying a white powder was recovered.

Example 3: Preparation of Copolymer X3
(Sty:PEGMA2000=4:1)

400.4 parts by weight of 1-propanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, 20.8 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 25900 g/mol. A translucent solution was obtained. After drying, a white powder was recovered.

Example 4: Preparation of Copolymer X4
(Sty:PEGMA2000=10:1)

400.4 parts by weight of 1-propanol, 208 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, 52 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 50700 g/mol. A turbid solution was obtained. After drying, a white powder was recovered.

Example 5: Preparation of Copolymer X5 (Sty:PEGMA2000=20:1)

400.4 parts by weight of 1-propanol, 208 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol and added in the reactor at 70° C. within one hour. Additionally, 104 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 29100 g/mol. A turbid solution was obtained. After drying, a white powder was recovered.

Example 6: Preparation of Copolymer X6 (Sty:PEGMA1000=1:1)

400.4 parts by weight of 1-propanol, 208 parts by weight of PEGMA1000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, a mixture of 10.4 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. Mn found by SEC was 8830 g/mol. A clear solution was obtained. After drying, a white powder was recovered.

Example 7: Preparation of Copolymer X7 (Sty:PEGMA550=1:1)

400.4 parts by weight of 1-propanol, 220 parts by weight of PEGMA550 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, a mixture of 20.8 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The reaction mixture was kept at 70° C. for another 2 hours, before being submitted to purification by water steam distillation. Mn found by SEC was 39100 g/mol. A clear solution was obtained. After drying, a clear viscous liquid was recovered.

Example 8: Preparation of Copolymer X8 (Sty:PEGMA1000=1:4)

400.4 parts by weight of 1-propanol, 200 parts by weight of PEGMA1000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, a mixture of 2.6 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The total reaction mixture was kept at 70° C. for another 2 hours, before being submitted to purification by water steam distillation. A clear solution was obtained. After drying, a white powder was recovered.

Example 9: Preparation of Copolymer X9 (Sty:PEGMA550=1:15)

400.4 parts by weight of 1-propanol, 200 parts by weight of PEGMA550 50 wt % water solution and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of 1-propanol were added in the reactor at 70° C. within one hour. Additionally, a mixture of 1.3 parts by weight of styrene in 180.7 parts by weight of 1-propanol and 2 parts by weight of Wako V 59 in 100 parts by weight of 1-propanol were successively added within the next 2 hours. Thereafter, 100 parts by weight of 1-propanol and 2 parts by weight of Wako V 59 were added during 6 h. The reaction mixture was kept at 70° C. for another 2 hours, before being submitted to purification by water steam distillation. A clear solution was obtained. After drying, a transparent viscous liquid was recovered.

Example 10: Preparation of Copolymer X10 (Sty:PEGMA2000=1:1) Via Emulsion Polymerization A solution of 0.7 parts by weight of styrene, 28 parts by weight of PEGMA2000 and 1.14 parts by weight of a universally applicable, non-ionic emulsifier for the manufacture of oil in water emulsions based on polyoxyethylene alkyl ethers prepared by the condensation of linear fatty alcohols derived from vegetable sources with ethylene oxide (Emulgin B2 PH) in 440 parts by weight of water were heated to 65° C. At 65° C. 0.5 parts by weight of sodium persulfate dissolved in 14 parts by weight of water were added to the reaction mixture while the temperature was increased to 80° C. at the same time. 10 minutes later 6.3 parts by weight of styrene, 25.2 parts by weight of PEGMA2000 and 1.8 parts by weight of Emulgin B2 PH in 180 parts by weight of water were added during 2.5 hours. At the same time, 1 part by weight of sodium persulfate dissolved in 80 parts by weight of water were added during 2.5 hours. The reaction mixture was kept at 80° C. for 5 hours. Then the reaction mixture was cooled to room temperature. A milky emulsion was obtained.

Example 11: Preparation of Copolymer X11 (Sty:PEGMA2000=1:1) Via Emulsion Polymerization without Emulsifier The experiment was carried out following the modified literature procedure described by A. Brindley S. S. Davis, M. C. Davies, J. F. Watts in the Journal of Colloid and Interface Science 1995, 171, 150-161. In a reactor 5.2 parts by weight of styrene were stirred (300 rpm) in 880 parts by weight of deionized water at 70° C. under nitrogen atmosphere. 216 parts by weight of PEGMA2000 50 wt % aqueous solution and 0.5 parts by weight of sodium persulfate were simultaneously added at 70° C., then the reaction medium was further stirred during 24 hours at 70° C., before being submitted to purification by water steam distillation. Mn found by SEC was 43100 g/mol.

Example 11A: Preparation of Copolymer X11A (Sty:PEGMA2000=1:1) Via Solution Polymerization in Toluene 300 parts by weight of toluene, 126 parts by weight of lyophilized (freeze dried) PEGMA2000 and 6.3 parts by weight of styrene were mixed under nitrogen and heated to 80° C. Afterwards, 2.65 parts by weight of 2,2'-azobis(2-methylbutyronitrile) (Wako V 59, Wako Chemicals GmbH, Germany) dissolved in 15 parts by weight of toluene were added to the reactor at 75° C. The reaction mixture was kept at 80° C. for 24 hours. A clear solution was obtained. After cooling to room temperature, the polymer was purified by precipitation in 2-Methoxy-2-methylpropane (1500 mL MTBE). After drying in a vacuum oven at 40° C. overnight a white powder was obtained.

Example 12: Preparation of Copolymer X12 in Isopropanol (Sty:PEGMA2000=1:1)

400.4 parts by weight of isopropanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of isopropanol were added in the reactor at 70° C. within one hour. Additionally, 5.2 parts by weight of styrene in 180.7 parts by weight of isopropanol and 2 parts by weight of Wako V 59 in 100 parts by weight of isopropanol were successively added within the next 2 hours. Thereafter, 100 parts by weight of isopropanol and 2 parts by weight of Wako V 59 were added during 6 h. The total reaction mixture was kept at 70° C. for another 2 hours, before being submitted to purification by water steam distillation. Mn found by SEC was 11300 g/mol. After drying, a white powder was recovered.

Example 13: Preparation of Copolymer X13 in Ethanol (Sty:PEGMA2000=1:1)

400.4 parts by weight of ethanol, 200 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of ethanol were added in the reactor at 70° C. within one hour. Additionally, 5.2 parts by weight of styrene in 180.7 parts by weight of ethanol and 2 parts by weight of Wako V 59 in 100 parts by weight of ethanol were successively added within the next 2 hours. Thereafter, 100 parts by weight of ethanol and 2 parts by weight of Wako V 59 were added during 6 h. The total reaction mixture was kept at 70° C. for another 2 hours, before being submitted to purification by water steam distillation. Mn found by SEC was 10500 g/mol. After drying, a white powder was recovered.

Example 14: Preparation of Copolymer X14 in Isopropanol (Sty:PEGMA2000=1:1)

300.4 parts by weight of isopropanol, 400 parts by weight of PEGMA2000 50 wt % solution in water and 0.025 parts by weight of 2,2'-azobis(2-methylbutyronitrile) (Wako V 59, Wako Chemicals GmbH, Germany) were mixed under nitrogen and heated to 75° C. Afterwards 0.375 parts by weight of 2,2'-azobis(2-methylbutyronitrile) (Wako V 59, Wako Chemicals GmbH, Germany) dissolved in 9.6 parts by weight of isopropanol were added in the reactor at 70° C. within one hour. Additionally, 5.2 parts by weight of styrene in 80 parts by weight of isopropanol and 2 parts by weight of Wako V 59 in 100 parts by weight of isopropanol were successively added within the next 2 hours. Thereafter, 100 parts by weight of isopropanol and 2 parts by weight of Wako V 59 were added during 6 h. The total reaction mixture was kept at 70° C. for another 2 hours, before being submitted to purification by water steam distillation. Mn found by SEC was 18500 g/mol. After drying, a white powder was recovered.

Example 15: Coating of Model Surfaces and Evaluation of Protein Adsorption by QCM-D The SA of polymer coatings on the model surface and protein adsorption were determined by QCM-D by the method given above.

Adsorption of polymer on the model surfaces was carried out by equilibrating the modified quartz sensor surface with 0.1 wt % polymer solution in HEPES buffer until a monolayer was formed (step 2) above). Afterwards, the sensor surface was rinsed with buffer until a stable mass reading was obtained (step 3) above).

Protein adsorption was monitored during exposure of the samples to 0.1 wt % solutions of BSA (experiments 15.1 to 15.10) or milk powder (experiments 15.11 to 15.52) in HEPES buffer for 0.5 h. The final mass change was recorded after another 0.5 h of rinsing with buffer (steps 4) and 5) above). The results are given in Tables 1 and 2.

TABLE 1

SA of polymers P and BSA adsorption on selected model surfaces

| Example No. | Model surface | Polymer P adsorbed on the polymer model surface | Surface Adhesion SA [ng/cm$^2$] | BSA adsorbed amount ([ng/cm$^2$]) | Fouling wt % |
|---|---|---|---|---|---|
| 15.1 | PES | / | / | 426 ± 57 | 100% |
| 15.2 | PVDF | | | 330 ± 30 | |
| 15.3 | PS | | | 420 ± 18 | |
| 15.4 | TOPAS | | | 1060 ± 66 | |
| 15.5 | PES | X2 | 302 ± 30 | 0 | 0% |
| 15.8 | PVDF | | 400 ± 70 | 0 | 0% |
| 15.9 | PS | | 781 ± 186 | 0 | 0% |
| 15.10 | TOPAS | | 368 ± 17 | 0 | 0% |

TABLE 2

SA of polymers P and milk adsorption on selected model surfaces

| Example No. | Model surface | Polymer P adsorbed on the polymer model surface | Surface Adhesion SA [ng/cm$^2$] | Milk adsorbed amount ([ng/cm$^2$]) | Fouling wt % |
|---|---|---|---|---|---|
| 15.11 | PES | / | / | 458 ± 10 | 100% |
| 15.12 | PVDF | | | 424 ± 25 | |
| 15.13 | PA | | | 404 ± 30 | |
| 15.14 | PS | | | 399 ± 59 | |
| 15.15 | Octadecan-ethiol | | | 375 ± 59 | |
| 15.16 | PES | X1 | 193 ± 50 | 131 ± 10 | 28.6% |
| 15.17 | PVDF | | 168 ± 70 | 172 ± 30 | 40.6% |
| 15.18 | PA | | 241 ± 50 | 214 ± 25 | 53.0% |
| 15.19 | PES | X2 | 302 ± 30 | 0 ± 2 | 0.0% |
| 15.20 | PVDF | | 400 ± 70 | 19 ± 30 | 4.5% |
| 15.21 | PA | | 309 ± 50 | 38 ± 20 | 9.4% |
| 15.22 | PS | | 781 ± 186 | 30 ± 15 | 7.5% |
| 15.23 | Octadecan-ethiol | | 445 ± 33 | 42 ± 12 | 11.2% |
| 15.24 | PES | X3 | 311 ± 40 | 16 ± 10 | 3.5% |
| 15.25 | PVDF | | 390 ± 100 | 55 ± 15 | 13.0% |
| 15.26 | PA | | 330 ± 10 | 69 ± 10 | 17.1% |
| 15.27 | PES | X4 | 348 ± 60 | 36 ± 10 | 7.9% |
| 15.28 | PVDF | | 397 ± 50 | 44 ± 10 | 10.4% |
| 15.29 | PA | | 431 ± 20 | 74 ± 20 | 18.3% |
| 15.30 | PES | X5 | 454 ± 100 | 36 ± 15 | 7.9% |
| 15.31 | PVDF | | 377 ± 50 | 43 ± 15 | 10.1% |
| 15.32 | PA | | 608 ± 40 | 43 ± 5 | 10.6% |
| 15.33 | PES | X6 | 266 ± 30 | 17 ± 10 | 3.7% |
| 15.34 | PVDF | | 199 ± 10 | 42 ± 9 | 9.9% |
| 15.35. | PA | | 218 ± 31 | 126 ± 35 | 31.2% |
| 15.36 | PES | X7 | 315 ± 80 | 21 ± 30 | 4.6% |
| 15.37 | PVDF | | 306 ± 41 | 23 ± 9 | 5.4% |
| 15.38 | PA | | 332 ± 98 | 119 ± 18 | 29.5% |
| 15.39 | PES | X8 | 226 ± 8 | 51 ± 13 | 11.1% |
| 15.40 | PVDF | | 251 ± 9 | 97 ± 12 | 22.9% |
| 15.41 | PA | | 180 ± 44 | 145 ± 63 | 35.9% |
| 15.42 | Octadecan-ethiol | | 226 ± 8 | 51 ± 13 | 13.6% |
| 15.43 | PES | X9 | 304 ± 72 | 53 ± 17 | 11.6% |
| 15.44 | PVDF | | 383 ± 23 | 88 ± 4 | 20.8% |
| 15.45 | PA | | 426 ± 87 | 110 ± 43 | 27.6% |
| 15.46 | Octadecan-ethiol | | 304 ± 72 | 53 ± 17 | 14.1% |
| 15.47 | PES | X10 | 253 ± 39 | 147 ± 44 | 39.2% |
| 15.48 | PES | X11 | 275 ± 60 | 156 ± 40 | 34.1% |
| 15.49 | PES | X12 | 421 ± 7 | 0 | 0% |
| 15.50 | PES | X13 | 408 ± 25 | 0 | 0% |
| 15.51 | PES | X14 | 343 ± 5 | 0 | 0% |
| 15.52 | PES | X11A | 335 ± 67 | 69 ± 24 | 15.1% |

The invention claimed is:

1. A biosensor BS comprising at least one polymer P, wherein said polymer P is a copolymer of styrene and at least one ester E of (meth)acrylic acid and polyethylene oxide,
wherein said polymer P has a surface adsorption SA of at least 200 ng/cm2 on a respective surface where polymer P is deposited, said SA being determined by quartz crystal microbalance, and
wherein said polymer P comprises styrene and at least one ester E in a molar ratio of 0.05:1 to 50:1.

2. The biosensor according to claim 1, wherein said polymer P has been deposited on a surface O of at least one biorecognition element B or on a surface of a tube, pipe or housing that are part of said biosensor BS.

3. A bio-recognition element B having a surface O and comprising on said surface O at least one bioreceptor BR, wherein said surface O is at least partly coated with at least one polymer P,
wherein said polymer P is a copolymer of styrene and at least one ester E of (meth)acrylic acid and polyethylene oxide,
wherein said polymer P has a surface adsorption number SAN of at least 200 ng/cm2 on surface O, said SAN being determined by quartz crystal microbalance, and
wherein said polymer P comprises styrene and at least one ester E in a molar ratio of 0.05:1 to 50:1.

4. The biosensor according to claim 1, wherein said polymer P comprises styrene and at least one ester E in a molar ratio of 0.2:1 to 15:1.

5. The biosensor according to claim 1, wherein said at least one ester E has an average molar mass Mn of 300 to 10000 g/mol.

6. The biosensor according to claim 1, wherein said at least one ester E has an average molar mass Mn of 800 to 3000 g/mol.

7. The biosensor according to claim 1, wherein said polymer P has an average molar mass Mn of 5000 to 100,000 g/mol.

8. The biosensor according to claim 1, wherein said polymer P is a statistical copolymer.

9. The biosensor according to claim 1, wherein said polymer P is deposited as a self-assembled monolayer.

10. A process for making a bio-recognition element B, comprising:
A) applying a solution S of at least one polymer P, wherein said polymer P is a copolymer of at least monomer M and at least one ester E of (meth)acrylic acid and polyethylene oxide, wherein said monomer M is different from said ester E and has at least one ethylenically unsaturated double bond, and wherein polymer P has a surface adsorption SA of at least 200 ng/cm2 on a surface O, and
B) depositing at least one bioreceptor BR on the surface; wherein said B) depositing can be carried out before, during or after said A) applying.

11. The process according to claim 10, wherein said B) depositing is carried out after said A) applying, the process further comprising, after said A) applying and before said B) depositing, removing the solvent of said aqueous solution S from the surface.

12. The process according to claim 10, wherein:
said B) depositing is carried out before said A) applying,
the process further comprises, after said B) depositing and before said A) applying, optionally removing solvent present during said B) depositing, and
the process further comprises, after said A) applying, optionally removing the solvent of said aqueous solution S from the surface.

13. The process according to claim 10, wherein said solution S comprises at least 50% by weight of water.

14. The process according to claim 10, wherein said aqueous solution S comprises 0.001 to 1% by weight of polymer P.

\* \* \* \* \*